Jan. 10, 1950     J. T. CAMPBELL     2,494,282
PHOTOGRAPHIC PRINTING FRAME
Filed June 19, 1947
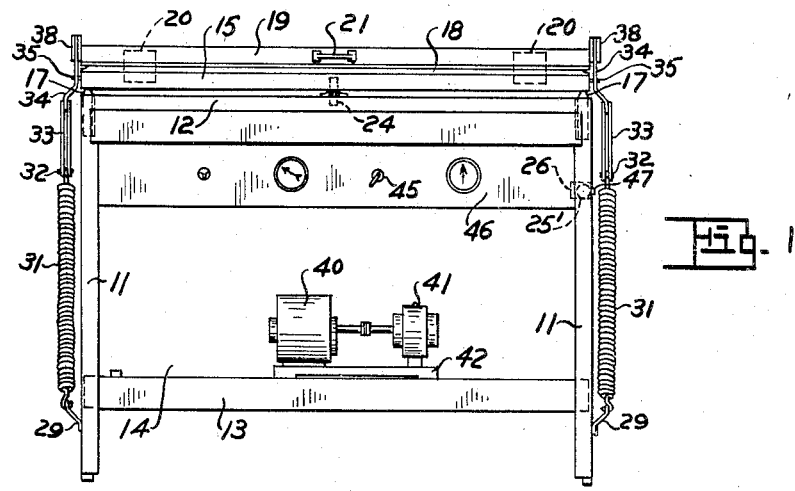
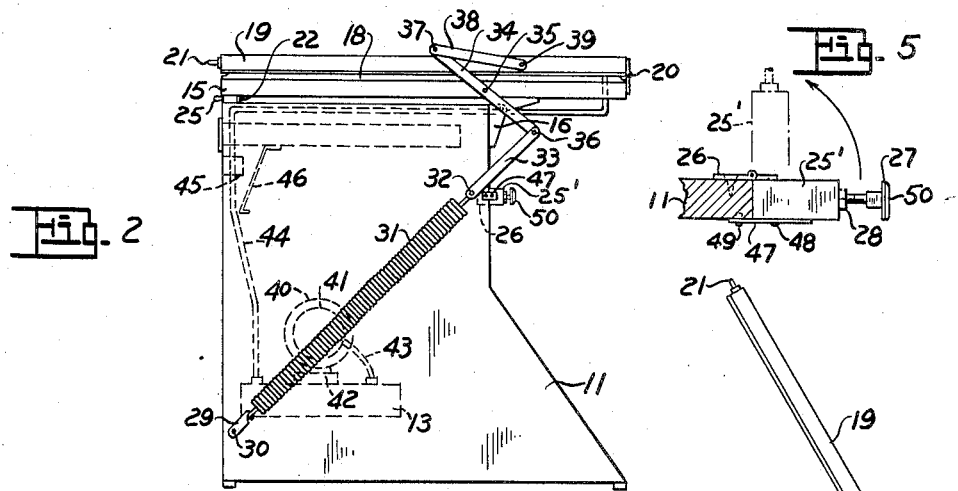
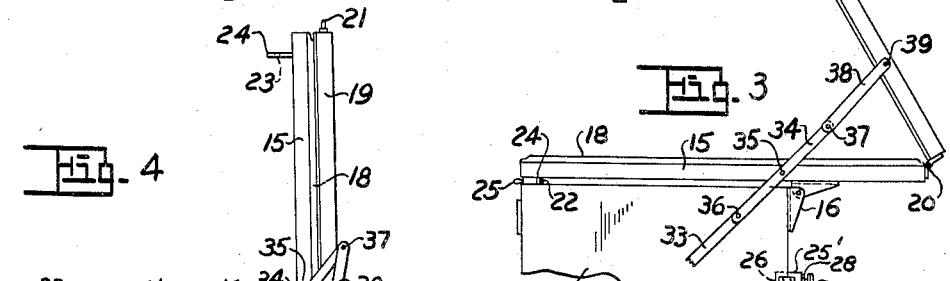
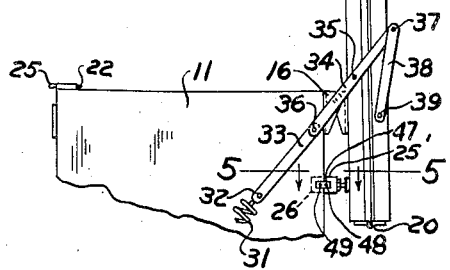
INVENTOR.
JAMES T. CAMPBELL.
BY
Robert A. Sloman
ATTORNEY Patented Jan. 10, 1950

2,494,282

UNITED STATES PATENT OFFICE 2,494,282

PHOTOGRAPHIC PRINTING FRAME

James T. Campbell, Detroit, Mich.

Application June 19, 1947, Serial No. 755,547

4 Claims. (Cl. 95—76)

This invention relates to printing frames and more particularly to a vacuum contact printer.

It is the object of this invention to provide a blanket frame pivotally mounted upon a supporting housing together with an adjustable stop upon said housing to limit the upward tilting movements of said frame for vertically positioning the same.

It is the object of this invention to provide a pivotal mounting for said stop whereby the same may be swung inwardly out of the path of said frame permitting freedom of movement thereof.

It is the object of this invention to provide an adjusting feature for said stop whereby said frame may be retained in positions other than vertical.

It is the further object of this invention to provide a glass frame mounted upon said blanket frame and pivotally joined thereto whereby both frames may be tilted together upon said housing, together with means for retaining said blanket frame in horizontal position permitting independent upward tilting of said glass frame relatively thereto.

It is the further object of this invention to provide a novel spring fulcrum means for controlling upward and downward pivotal movements of said glass frame alone, or both frames together.

It is the still further object of this invention to provide a spring fulcrum means tending to retain the glass frame closed, but which also permits its opening relative to the blanket frame with little effort.

It is the still further object of this invention to provide a resilient fulcrum bracket means which equalizes the weight of the loaded blanket frame making it exceptionally easy to swing the same into position for printing.

These and other objects will be seen from the following specification and claims in conjunction with the appended drawing in which:

Figure 1 is a front elevational view of the vacuum printing frame.

Figure 2 is a right side elevational view thereof.

Figure 3 is a fragmentary right side elevational view thereof with the glass frame open.

Figure 4 is a similar view with both frames open to a vertical position; and

Figure 5 is an enlarged fragmentary plan view on line 5—5 of Figure 4 illustrating the frame backstop.

It will be understood that the above drawing illustrates merely a preferable embodiment of the invention, and that other embodiments are contemplated within the scope of the claims hereinafter set out.

Referring to the drawing, the vacuum printer comprises a housing including side walls 11, top supporting wall 12 and the lower reinforcing rectangularly shaped vacuum reservoir 13, which is interposed and secured between side walls 11 and rear wall 14.

Rectangularly shaped blanket frame 15 is mounted on the top wall 12 of said housing and is pivotally joined thereto by the interconnecting hinges 16 secured to the top rear edges of side walls 11.

Hinges 16 are joined to blanket frame 15 intermediate its ends and towards its rear portion, while the front portion of said frame bears upon the rubber knob bumpers 17 when in horizontal position.

Blanket frame 15 has a resilient and flexible preferably rubber blanket extending across the same, with its peripheral or outer edges formed into the raised resilient beading 18 projecting above the surface of the frame.

Glass frame 19 is pivotally joined at its rear edge to the rear edge of blanket frame 15 by the hinges 20, and in horizontal position its glass portion bears snugly and sealingly upon beading 18.

Glass frame 19 has a handle 21 for lifting the same pivotally relatively to blanket frame 15 about hinges 20.

Resiliently retained latch 22 is centrally mounted upon the front portion of top wall 12 and projects inwardly as in Figures 2 and 4 to retainingly project through a corresponding opening 23 on the latch catch 24 which extends below blanket frame 15.

In its horizontal position opening 23 is in alignment with latch 22 which resiliently projects thereinto for locking and retaining said blanket in horizontal position. Glass frame 19 is thus free for independent upward and downward tilting movements relative to blanket frame 15. However, latch handle 25 when manually actuated will withdraw latch 22 releasing blanket frame 15, and by means of a resilient toggle mechanism hereafter described both blanket and glass frames will automatically swing upward toward a vertical position. Under some conditions the frames will not move automatically, but are so counter-balanced as to require little effort in raising the same.

Hollow back stop 25' is operatively positioned upon the rear edge of one of the side walls 11 and is supported thereon by hinge 26. Back stop adjusting screw 27 with rubber bumper 50 is adapted to cooperatively bear against the bottom edge of frame 15, and threadably extends through the outer end of back stop 25' for relative adjustment therein. Lock nut 28 on screw 27 functions to secure said screw in adjusted position.

As viewed in Figure 4 blanket frame 15 cooperatively bears against the adjusting screw 27 which regulates the vertical position of said frame. Being adjustable, it is seen that any other desired position may be attained.

Stop 25' may be moved aside by swinging the same inwardly upon its hinge support 26 whereby the frames may be moved reciprocally at angles for underprinting.

A back stop catch is provided consisting of the flexible strip 47 secured to stop 25' by screw 48. Catch 47 projects upon and extends from the inner end of back stop 25' and cooperatively bears against the outside surface of side wall 11.

Strip 47 has a rivet 49 adjacent its outer end which is adapted to cooperatively project within a corresponding opening formed in side wall 11 for receiving said rivet, and tending to retain the back stop in its operative position.

Toggle anchor clips 29 are secured at 30 to the lower forward portions of side walls 11. Coil springs 31 are connected at their lower ends to clips 29, while their upper ends are joined at 32 to the lower toggle links 33.

Center toggle links 34 are pivotally mounted centrally by suitable shoulder screws 35 which project into the opposite side portions of blanket frame 15.

Links 34 are pivotally joined at their lower ends at points 36 to the upper ends of links 33. The upper ends of links 34 are joined at 37 to the outer ends of upper toggle links 38. The inner ends of links 38 are joined at 39 to the side wall portions of glass frame 19. The upper toggle links are joined to the glass frame, the center toggle links are pivotally mounted upon the blanket frame, while the lower toggle links are joined to the coil springs 31.

With blanket frame 15 retained horizontally by latch 22, glass frame 19 may be lifted by handle 21. With the spring and fulcrum bracket arrangement the glass frame may be raised with very slight effort to any position for loading and will remain in that position until moved. No balance weights are required. Under some conditions of the toggle links and springs said glass frame may open automatically once it is released.

With the blanket frame loaded the glass frame is pivotally returned to a horizontal position to cooperatively engage the beading upon said blanket frame for sealing engagement therewith. The vacuum communication is now established between the upper surface of the blanket frame and the vacuum reservoir 13.

Then latch 22 is withdrawn through actuation of handle 25 to release blanket frame 15 therefrom. Both frames may now be raised to a vertical position for making prints.

The spring fulcrum arrangement also equalizes the weight of the loaded frames making it exceptionally easy to swing the same into vertical position for printing. In fact with latch 22 released the two frames under certain conditions will pivotally tip upward automatically under action of springs 31.

Electric motor 40 and vacuum pump 41 coupled together are mounted upon platform 42 secured upon vacuum reservoir or tank 13, which acts as a convenient platform as well as a reinforcement for the side walls 11 of the printer.

Vacuum pipe 43 interconnects vacuum pump 41 and reservoir 13, Figure 2, while flexible conduit 44 interconnects reservoir 13 and the upper surface of blanket frame 15 for establishing vacuum communication between the glass and blanket frames. Though forming no part of the present invention a three-way valve 45 is provided upon panel 46 for establishing vacuum communication into blanket frame 15, consequently pipe 44 is intermediately joined by said three-way valve 45.

By this arrangement, after the blanket is loaded with the negative and the sensitized plate, and after the glass frame is again pivoted to a horizontal position in sealing engagement with blanket frame 15, then the control valve 45 is turned on and vacuum is established between the two frames. Once sealed to each other said frames will stay sealed together until the vacuum is released by turning valve 45 to the off position.

With said frames 15 and 19 sealed together it will be seen that the same will be elevated together to printing position as soon as latch 22, 25 is released.

Having described my invention reference should now be had to the claims which follow for determining the scope thereof.

I claim:

1. In a vacuum printing frame, a housing, a normally horizontal blanket frame pivotally mounted thereon, a glass frame pivotally mounted upon said bracket frame, a center toggle link pivotally joined intermediate its ends to said blanket frame, an upper toggle link joined at one end to said glass frame and at its other end to the upper end of said center toggle link, a lower toggle link joined at one end to the other end of said center link, and resilient tension means anchored to said housing and joined to the other end of said lower link.

2. In a vacuum printing frame, a housing, a normally horizontal blanket frame pivotally mounted thereon, a glass frame pivotally mounted upon said blanket frame, a center toggle link pivotally joined intermediate its ends to said blanket frame, an upper toggle link pivotally joined at one end to said glass frame and at its other end to the upper end of said center link, resilient tension means anchored to said housing, and a lower toggle link joined at one end to said resilient means and pivotally joined at its other end to the other end of said center link.

3. In a vacuum printing frame, a housing, a normally horizontal blanket frame pivotally mounted thereon, a glass frame pivotally mounted upon said blanket frame, a center toggle link pivotally joined intermediate its ends to said blanket frame, an upper toggle link pivotally joined at one end to said glass frame and at its other end to the upper end of said center link, resilient tension means anchored to said housing, and a lower toggle link joined at one end to said resilient means and at its other end pivotally joined to the other end of said center link, whereby with the blanket frame retained against movement said glass frame may be raised with slight effort to any position, for loading and will remain in that position until moved.

4. In a vacuum printing frame, a housing, a normally horizontal blanket frame pivotally mounted thereon, a glass frame pivotally mounted upon said blanket frame, a center toggle link pivotally joined intermediate its ends to said blanket frame, an upper toggle link joined at one end to said glass frame and at its other end to the upper end of said center link, resilient tension means anchored to said housing, and a lower toggle link joined at one end to said resilient means and pivotally joined at its other end to the other end of said center link, whereby the weight of the two frames is equalized making it exceptionally easy to swing the same into vertical position for printing.

JAMES T. CAMPBELL.

REFERENCES CITED

The following references are of record in the file of this patent:

UNITED STATES PATENTS

| Number | Name | Date |
|---|---|---|
| 1,521,632 | Klitchi | Jan. 6, 1925 |
| 1,956,887 | Watres | May 1, 1934 |
| 2,170,622 | Sussin | Aug. 22, 1939 |
| 2,210,726 | Mazzoco | Aug. 6, 1940 |
| 2,257,581 | Ulsheimer | Sept. 30, 1941 |
| 2,270,578 | Campbell | Jan. 20, 1942 |
| 2,366,722 | Gaebel | Jan. 9, 1945 |

FOREIGN PATENTS

| Number | Country | Date |
|---|---|---|
| 326,379 | Great Britain | Mar. 13, 1930 |